(12) United States Patent
Merg

(10) Patent No.: US 9,336,244 B2
(45) Date of Patent: May 10, 2016

(54) METHODS AND SYSTEMS FOR GENERATING BASELINES REGARDING VEHICLE SERVICE REQUEST DATA

(71) Applicant: Snap-on Incorporated, Kenosha, WI (US)

(72) Inventor: Patrick S. Merg, Hollister, CA (US)

(73) Assignee: Snap-on Incorporated, Kenosha, WI (US)

( * ) Notice: Subject to any disclaimer, the term of this patent is extended or adjusted under 35 U.S.C. 154(b) by 189 days.

(21) Appl. No.: 13/963,403

(22) Filed: Aug. 9, 2013

(65) Prior Publication Data

US 2015/0046391 A1 Feb. 12, 2015

(51) Int. Cl.
| | |
|---|---|
| *G06F 7/00* | (2006.01) |
| *G06Q 40/00* | (2012.01) |
| *G06F 17/00* | (2006.01) |
| *G06F 17/30* | (2006.01) |
| *G06Q 10/00* | (2012.01) |

(52) U.S. Cl.
CPC .......... *G06F 17/30289* (2013.01); *G06Q 10/20* (2013.01)

(58) Field of Classification Search
USPC .............................. 701/29.3; 705/4; 707/736
See application file for complete search history.

(56) References Cited

U.S. PATENT DOCUMENTS

| | | | |
|---|---|---|---|
| 4,258,421 A * | 3/1981 | Juhasz et al. ................. | 701/33.2 |
| 5,058,044 A | 10/1991 | Stewart et al. | |
| 5,072,380 A | 12/1991 | Randelman et al. | |
| 5,299,550 A | 4/1994 | Inoue | |
| 5,442,553 A | 8/1995 | Parrillo | |
| 5,459,304 A | 10/1995 | Eisenmann | |

(Continued)

FOREIGN PATENT DOCUMENTS

| | | |
|---|---|---|
| EP | 1569176 | 8/2005 |
| WO | 02/17118 A2 | 2/2002 |

(Continued)

OTHER PUBLICATIONS

Oracle Corporation, "Application Architecture", Oracle Database Concepts, 11 g Release 1(11.1) available at http://docs.oracle.com/cd/B28359 01/server.111/b28318/dist pro.htm (last visited Dec. 19, 2013), 5 pages.

(Continued)

*Primary Examiner* — Thomas G Black
*Assistant Examiner* — Tyler Paige
(74) *Attorney, Agent, or Firm* — McDonnell Boehnen Hulbert & Berghoff LLP

(57) ABSTRACT

Methods and systems for generating baselines based on vehicle service request (VSR) data are described. Additional VSR data accumulated after generating a baseline can be compared to the baselines, by a processor executing program logic, to detect a deviation in the additional VSR data. Responsive to detecting the deviation, a notification regarding the deviation can be provided. The notification can prompt receivers of the notification to analyze the baseline and VSR data and responsively prepare a service bulletin regarding the VSR data. The service bulleting can be provided to repair shop equipment (RSE) or to users of the RSE. VSR data pertaining to different vehicle models built on a common vehicle platform can be aggregated to increase an amount of VSR data used to generate a baseline. Multiple baselines can be generated for each of one or more vehicle models.

22 Claims, 6 Drawing Sheets

(56) References Cited

U.S. PATENT DOCUMENTS

| | | | |
|---|---|---|---|
| 5,520,160 A | 5/1996 | Aota et al. | |
| 5,995,898 A | 11/1999 | Tuttle | |
| 6,170,742 B1 | 1/2001 | Yacoob | |
| 6,263,322 B1 | 7/2001 | Kirkevold et al. | |
| 6,370,454 B1 | 4/2002 | Moore | |
| 6,768,935 B1 | 7/2004 | Morgan et al. | |
| 6,822,582 B2 | 11/2004 | Voeller et al. | |
| 6,823,258 B2* | 11/2004 | Ukai et al. | 705/4 |
| 6,845,307 B2 | 1/2005 | Rother | |
| 6,850,071 B1 | 2/2005 | Pederson et al. | |
| 7,020,620 B1 | 3/2006 | Bargnes et al. | |
| 7,092,937 B2* | 8/2006 | Morgan et al. | 707/736 |
| 7,127,455 B2 | 10/2006 | Carson et al. | |
| 7,487,035 B2 | 2/2009 | Nozawa et al. | |
| 7,536,457 B2* | 5/2009 | Miller | 709/224 |
| 7,542,832 B2 | 6/2009 | Nou | |
| 7,801,671 B1 | 9/2010 | Pederson et al. | |
| 7,973,653 B2 | 7/2011 | Adachi | |
| 8,095,261 B2 | 1/2012 | Howell et al. | |
| 8,140,358 B1* | 3/2012 | Ling et al. | 705/4 |
| 8,219,519 B2 | 7/2012 | Chakrabarty et al. | |
| 8,285,439 B2* | 10/2012 | Hodges | 701/31.5 |
| 8,868,288 B2* | 10/2014 | Plante et al. | 701/32.2 |
| 8,892,451 B2* | 11/2014 | Everett et al. | 705/4 |
| 8,924,240 B2* | 12/2014 | Depura et al. | 705/4 |
| 2002/0007237 A1 | 1/2002 | Phung et al. | |
| 2002/0059156 A1* | 5/2002 | Hwang et al. | 706/45 |
| 2002/0138185 A1 | 9/2002 | Trsar et al. | |
| 2002/0152115 A1* | 10/2002 | Morita et al. | 705/13 |
| 2003/0004624 A1 | 1/2003 | Wilson et al. | |
| 2003/0195681 A1 | 10/2003 | Rother | |
| 2004/0095244 A1 | 5/2004 | Conwell et al. | |
| 2004/0176885 A1 | 9/2004 | Quinn | |
| 2005/0085964 A1 | 4/2005 | Knapp et al. | |
| 2005/0149566 A1 | 7/2005 | Baek et al. | |
| 2005/0171661 A1 | 8/2005 | Abdel-Malek et al. | |
| 2005/0251450 A1 | 11/2005 | Koether et al. | |
| 2005/0273218 A1 | 12/2005 | Breed et al. | |
| 2006/0095230 A1 | 5/2006 | Grier et al. | |
| 2006/0101074 A1 | 5/2006 | Cancilla et al. | |
| 2006/0106797 A1 | 5/2006 | Srinivasa et al. | |
| 2007/0043487 A1 | 2/2007 | Krzystofczyk et al. | |
| 2007/0124040 A1 | 5/2007 | Chen | |
| 2008/0004764 A1 | 1/2008 | Chinnadurai et al. | |
| 2008/0040268 A1* | 2/2008 | Corn | 705/40 |
| 2008/0110239 A1 | 5/2008 | Maegawa | |
| 2009/0055045 A1 | 2/2009 | Biswas et al. | |
| 2009/0062977 A1 | 3/2009 | Brighenti | |
| 2009/0295559 A1 | 12/2009 | Howell et al. | |
| 2010/0023203 A1 | 1/2010 | Shibi | |
| 2010/0063668 A1 | 3/2010 | Zhang et al. | |
| 2010/0152962 A1 | 6/2010 | Bennett et al. | |
| 2010/0211249 A1 | 8/2010 | McClellan | |
| 2011/0118905 A1 | 5/2011 | Mylaraswamy et al. | |
| 2011/0118934 A1 | 5/2011 | Lowrey et al. | |
| 2011/0172874 A1 | 7/2011 | Patnaik et al. | |
| 2011/0238258 A1 | 9/2011 | Singh et al. | |
| 2011/0270706 A1* | 11/2011 | Anspach et al. | 705/26.61 |
| 2011/0279283 A1* | 11/2011 | Corn | 340/686.6 |
| 2012/0215491 A1 | 8/2012 | Theriot et al. | |
| 2012/0245791 A1 | 9/2012 | Yun et al. | |
| 2012/0303205 A1 | 11/2012 | Subramania et al. | |
| 2013/0018804 A1 | 1/2013 | Swinson et al. | |
| 2013/0304306 A1 | 11/2013 | Selkirk et al. | |
| 2013/0325541 A1* | 12/2013 | Capriotti et al. | 705/7.21 |
| 2014/0121888 A1 | 5/2014 | Guo et al. | |
| 2014/0207771 A1 | 7/2014 | Merg | |

FOREIGN PATENT DOCUMENTS

| | | |
|---|---|---|
| WO | 2004092918 A2 | 10/2004 |
| WO | 2013063232 A1 | 5/2013 |
| WO | 2014001799 A1 | 1/2014 |

OTHER PUBLICATIONS

U.S. Appl. No. 14/270,994, filed May 6, 2014, 61 pages.

The Stanford Natural Language Processing Group, the Stanford natural language processing group, downloaded from the World Wide Web at http://nlp.stanford.edu/software/index.shtml on Oct. 17, 2014, 3 pages.

Snap-on Incorporated, ShopKeyPro, Apr. 13, 2012, 4 pages.

The Stanford Natural Language Processing Group, Stanford CoreNLP, downloaded from the World Wide Web at http://nlp/stanford.edu/software/corenlp.shtml on Oct. 17, 2014, 8 pages.

Consortium on Conginitive Science Instruction; Introduction to natural language processing, downloaded from the World Wide Web at http://www.mind.ilstu.edu/curriculum/protothinker/nuatural_language_processing.php on Oct. 21, 2013, 32 pages.

Dickinson, Marcus; Linguistics 362: Introduction to Natural Language Processing; Jul. 1, 2012; 48 pages.

Muller, Tobias Carsten; et al.; A Heuristic Approach for Offboard-Diagnostics in Advanced Automotive Systems; Apr. 20, 2009; 9 pages; SAE World Congress 2009, Detroit, MI, USA; SAE Document No. 2009-01-1027.

Jain, Anil K.; Mao, Jianchang; Mohiuddin, K.M; Artificial Neural Networks: A Tutorial; Mar. 1996; 14 pages; IEEE.

Jain, A.K.; Murty, M.N.; Flynn, P.J.; Data Clustering: A Review; Sep. 1999; 60 pages; ACM Computing Surveys, vol. 31, No. 3.

International Searching Authority at US Patent Office, Notification of transmittal of the international search report and the written opinion of the international searching authority, or the declaration, mailed on Apr. 6, 2015 in connection with international application PCT/US14/48542, 1 page.

International Searching Authority at US Patent Office, international search report, on form PCT/ISA/210, in connection with international application PCT/US14/48542, with search history, mailed on Apr. 6, 2015, 7 pages.

International Searching Authority at US Patent Office, written opinion of the international searching authority, on form PCT/ISA/237, in connection with international application PCT/US14/48542, mailed on Apr. 6, 2015, 6 pages.

U.S. Appl. No. 14/260,929, filed Apr. 24, 2014, 79 pages.

Sankavaram, Chaitanya et al, "Event-driven Data Mining Techniques for Automotive Fault Diagnosis," 21st International Workshop on Principles of Diagnosis, pp. 1-8 (Oct. 13-16, 2010).

Auterra, LLC, "DashDyno SPD Automotive Computer", last visited Feb. 21, 2011, available at http://www.auterraweb.com/, 1 page.

Deal Extreme.com, "ELM327 Bluetooth OBD-II Transceiver Dongle", Oct. 22, 2008, available at http://www/dealextream.com/p/elm327-bluetooth-obd-il-wireless-transceiver-dongle-16921 (last visited Feb. 21, 2011), 5 pages.

Automotive Test Solutions, Inc. "EScan-Automotive Test Solutions", 2006, available at http://atsnm.com/escan.htm (last visited Feb. 21, 2011), 6 pages.

A.K. Jain et al, "Statistical Pattern Recognition: A Review", IEEE Transactions on Pattern Analysis and Machine Inteliegence, vol. 22, No. 1. Jan. 2000, pp. 4-37.

K. Layne, "Reading a Vacuum Gauge", Motor, Aug. 2001, pp. 47-50, available at http://www.motor.com/magazine/pdfs/082001_05.pdf (last visited Feb. 21, 2011).

Snap-on Inc., "VERDICT user Manual", EAZ0063L05A Rev. A, Aug. 2010, 149 pages.

Wikipedia, "Expert System", Oct. 5, 2010, available at http://en.wikipedia.org/wiki/Expert_system (last visited Oct. 6, 2010), 7 pages.

Wikipedia, "Inference Engine", Jun. 21, 2010, available at http://en.wikipedia.org/wiki/Inference_engine (last visited Oct. 6, 2010), 2 pages.

Wikipedia, "Pearson product-moment correlation coefficient", Feb. 18, 2011, available at http://en.wikipedia.org/wiki/Pearson_product_moment_correlation_coefficient (last visited Feb. 21, 2011), 6 pages.

U.S. Appl. No. 13/031,565, filed Februrary 21, 2011, 85 pages.

* cited by examiner

600

METHODS AND SYSTEMS FOR GENERATING BASELINES REGARDING VEHICLE SERVICE REQUEST DATA

BACKGROUND

Many products produced by manufacturers occasionally have to be repaired. Many owners are unequipped or otherwise unable to repair certain products. Such owners may depend on professional repair technicians to service or repair the owner's product.

The repair technicians typically repair products at a product repair shop. A repair shop has traditionally produced a repair order (RO) to capture a variety of information regarding a request for servicing or repairing a product. As an example, the captured information can include information identifying the product, the product's owner, the repair shop, the date of repair, and the type of repair or service needed or performed. The RO can exist in various formats such as a paper format or an electronic format.

The repair technicians working on different instances of a common product can be located in various locations, such that a first repair technician located at a first location is not aware of a repair made by a second repair technician at a second location. It may be beneficial, if the second repair technician could obtain information regarding the repair made by the first technician.

OVERVIEW

Example embodiments are described herein. In one respect, one or more example embodiments can be arranged as a method comprising (i) storing, by a non-transitory computer-readable data storage device, a first vehicle service request (VSR) data collected from a plurality of vehicle service requests pertaining to vehicles of a first vehicle type identified by a first common vehicle identification, (ii) generating, by a processor, a first VSR data baseline based on the first VSR data, (iii) modifying the first VSR data by adding to the first VSR data additional VSR data collected from vehicle services requests pertaining to vehicles of the first vehicle type, (iv) detecting, by the processor, a first deviation in the modified first VSR data with respect to the first VSR data baseline, and (v) providing, by the processor, a notification identifying the first deviation.

In another respect, one or more example embodiments can be arranged as a non-transitory computer-readable medium storing: a first vehicle service request (VSR) data collected from a plurality of vehicle service requests pertaining to vehicles of a first vehicle type identified by a first common vehicle identification, and program instructions executable by a processor to perform or cause performance of operations including: (i) generating a first VSR data baseline based on the first VSR data, (ii) modifying the first VSR data by adding to the first VSR data additional VSR data collected from vehicle services requests pertaining to vehicles of the first vehicle type, (iii) detecting a first deviation in the modified first VSR data with respect to the first VSR data baseline, and (iv) providing a notification identifying the first deviation.

In yet another respect, one or more example embodiments can be arranged as a system comprising: a processor, and a non-transitory computer-readable data storage device storing a first vehicle service request (VSR) data collected from a plurality of vehicle service requests pertaining to vehicles of a first vehicle type identified by a first common vehicle identification, and storing computer-readable program instructions, wherein the computer-readable program instructions are executable by the processor to: (i) generate a first VSR data baseline based on the first VSR data, (ii) modify the first VSR data by adding to the first VSR data additional VSR data collected from vehicle services requests pertaining to vehicles of the first vehicle type, (iii) detect a first deviation in the modified first VSR data with respect to the first VSR data baseline, and (iv) provide a notification identifying the first deviation.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings, in which.

DETAILED DESCRIPTION

I. Introduction

Figure 1:
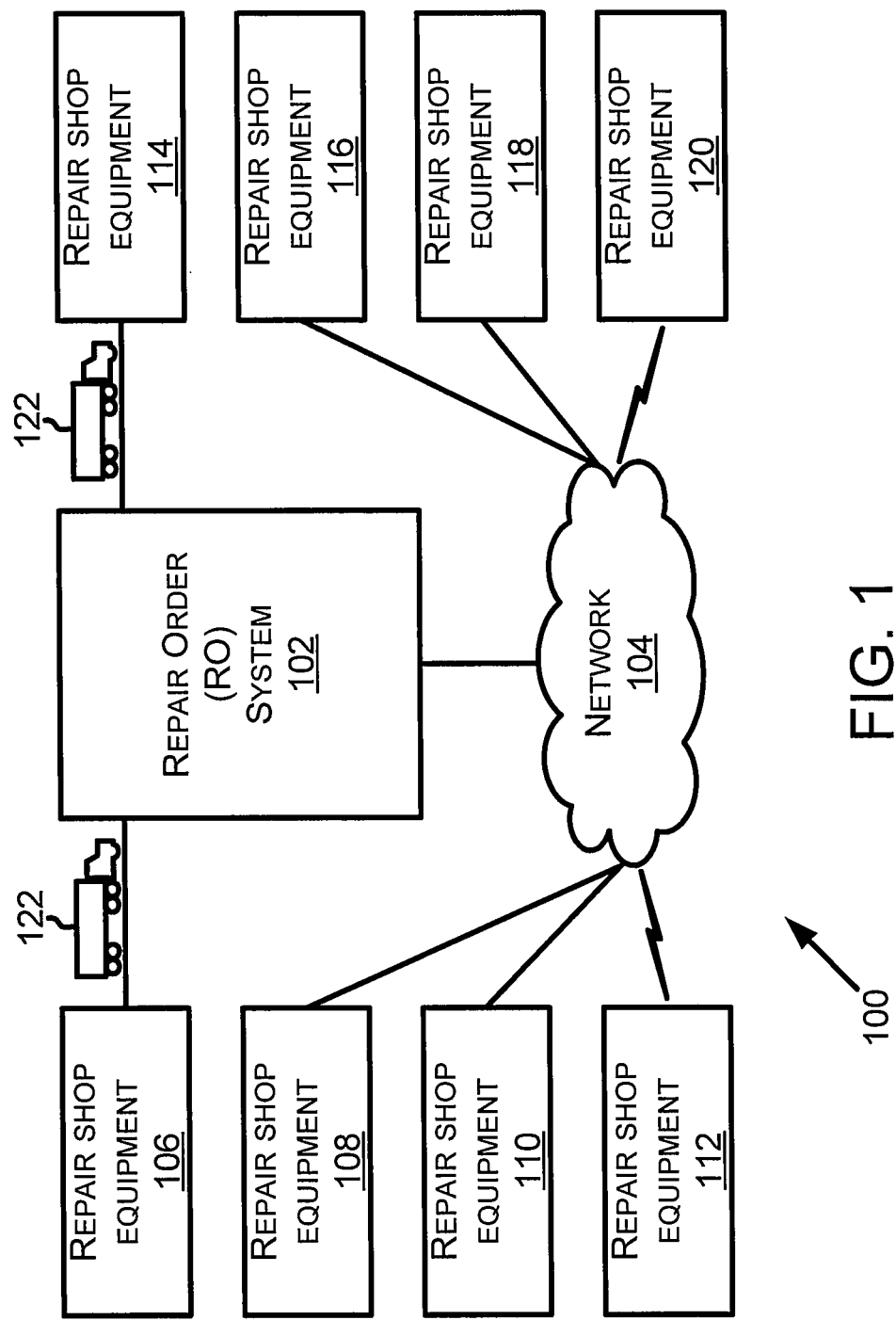
FIG. 1 is a block diagram of a system in accordance with one or more example embodiments.

This description describes several example embodiments including example embodiments regarding repair orders (RO) and baselines pertaining to vehicle service requests (VSRs) indicated on the RO.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

The example embodiments are applicable to a variety of repairable items, such as a vehicle or some other type of repairable item. For purposes of this description, a vehicle can comprise an automobile, a motorcycle, a semi-tractor, a light-duty truck, a medium-duty truck, a heavy-duty truck a farm machine, a boat or ship, a generator, an airplane, or some other type of vehicle. A vehicle can include or use any appropriate voltage or current source, such as a battery, an alternator, a fuel cell, and the like, providing any appropriate current and/or voltage, such as about 12 volts, about 42 volts, and the like. A vehicle can include or use any desired system or engine. Those systems or engines can comprise items that use fossil fuels, such as gasoline, natural gas, propane, and the like, electricity, such as that generated by a battery, magneto, fuel cell, solar cell and the like, wind and hybrids or combinations thereof. The example embodiments can carry out a variety of functions, including functions for diagnosing a vehicle.

The block diagrams and flow charts shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (e.g., machines, interfaces, functions, orders, or groupings of functions) can be used instead. Furthermore, various functions described as being performed by one or more elements can be carried out by a processor executing computer-readable program instructions or by any combination of hardware, firmware, or software.

Although many of the example embodiments are described with respect to a vehicle, the example embodiments can be applicable to other repairable items other than a vehicle. As an example, the other repair items can include home appliances, such as a refrigerator, a dishwasher, or a washing machine, or a consumer electronic device, such as a television, a cellular phone, or a tablet device. Other examples of the repairable items other than a vehicle are also possible.

II. Example Architecture

FIG. 1 is a block diagram of a system 100 in accordance with one or more example embodiments. Various combinations of the components shown in FIG. 1 can be arranged as other systems to carry out example embodiments described herein. System 100 includes a repair order (RO) system 102 and a network 104. Network 104 can include the Internet or a portion thereof, a wireless network, a wired network, a local area network (LAN), or some other type of network. System 100 includes repair shop equipment (RSE) 106, 108, 110, and 112 configured to generate or transmit RO to RO system 102. The RO generated by RSE 106 can be provided to an operator of RO system 102 by a courier 122, such as the United States Postal Service or the Federal Express Corporation. The operator of RO system 102 can enter RO into RO system 102 using an RO manual entry device.

System 100 includes repair shop equipment (RSE) 114, 116, 118, and 120. RSE 114, 116, 118, and 120 represent RSE that are configured for performing at least one of the following functions: request RO data stored at RO system 102, receive RO data transmitted from RO system 102 using network 104 or otherwise provided or generated by RO system 102, and present RO data by a user interface. Data generated by RO system 102 can be provided to an operator of RSE 114 by the courier 122. As an example, the courier 122 can provide the data by providing the RSE operator with a computer-readable medium, such as a CD-ROM, comprising the data generated by RO system 102. The functions performed by RSE 116, 118, and 120 can involve wireless or wired communications using network 104, as described with respect to RSE 108, 110, and 112.

Figure 2:
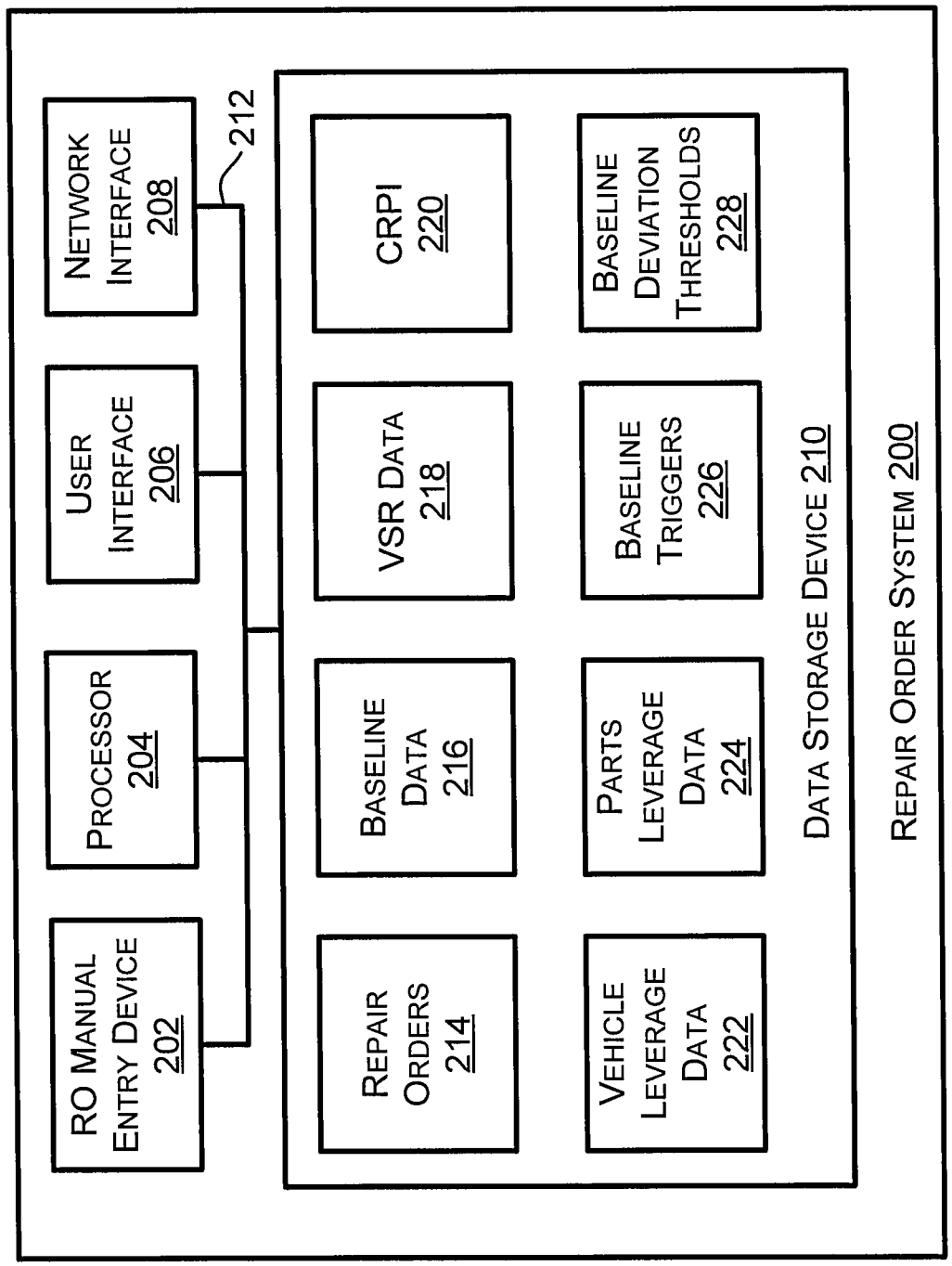
FIG. 2 is a block diagram showing details of a repair order system (ROS)

Next, FIG. 2 is a block diagram showing details of a repair order system (ROS) 200. Repair order system 102, shown in FIG. 1, can be configured similar to ROS 200. ROS 200 can be configured like ROS 102 shown in FIG. 1.

ROS 200 includes an RO manual entry device 202, a processor 204, a user interface 206, a network interface 208, and a data storage device 210, all of which can be linked together via a system bus, network, or other connection mechanism 212.

RO manual entry device 202 can include one or more devices for inputting data shown on a printed RO into RO system 200 for storage as an RO within repair orders (RO) 214. As an example, RO manual entry device 202 can include a scanner device with or without an optical character recognition software application. As another example, RO manual entry device 202 can comprise a keyboard for keying in (e.g., typing) and sending the data shown on the printed RO to processor 204 for storage as an RO within RO 214. As yet another example, RO manual entry device 202 can include a device that accepts data storage devices, such as a CD-ROM comprising data representing RO generated by a repair shop.

A processor, such as processor 204, can comprise one or more general purpose processors (e.g., INTEL single core microprocessors or INTEL multicore microprocessors) or one or more special purpose processors (e.g., digital signal processors). Processor 204 can be configured to execute computer-readable program instructions, such as computer-readable program instructions (CRPI) 220. For purposes of this description, processor 204 executing CRPI 220 to perform some function described herein can comprise executing a portion of CRPI 220 or the entirety of CRPI 220. Executing a portion or the entirety of CRPI 220 can include executing some of the computer-readable program instructions multiple times.

User interface 206 can comprise an interface to components operable to enter data or information into RO system 200 or to components that can present data or information output by RO system 200. Those components can be referred to as user interface components. User interface 206 can include one or more audio/visual ports or communication ports that connect to a user interface component by a wired or wireless user interface communication link.

User interface 206 can include one or more of the user interface components. As an example, the user interface components can include an infrared remote control device, a display device, a loud speaker configured to convert electrical signals to audible sounds, a keyboard, a touch screen, a pointing device, such as a computer mouse, or some other component for generating signals to enter data or information into RO system 200 or to present data or information output by user interface 206. User interface 206 can include a transmitter or transceiver to provide the data or information to another user interface component. The data or information provided by user interface 206 can include a notification identifying a deviation in VSR data detected by processor 204.

Network interface 208 can comprise an interface to one or more communication networks, such as network 104. For use with wireless communication networks, network interface 208 can comprise one or more antennas for transmitting or receiving wireless communications. Network interface 208 can include one or more communication ports configured to connect to a wired communication link of a network, such as a coaxial cable, an Ethernet cable, a fiber optic cable, a digital subscriber line (DSL), a telephone line of a public switched telephone network (PSTN) or some other wired connector. Network interface 208 can include a network controller including a transmitter, a receiver, or a transceiver. The transmitter or transceiver can provide data or information to a communication port for transmission as network communications over the connected network. The receiver or transceiver can receive data or information received at a communication port from the connected network. The data or information provided by network interface 208 can include a notification identifying a deviation in VSR data detected by processor 204.

A data storage device, such as data storage device 210, can comprise a non-transitory computer-readable storage medium readable by processor 210. In an alternative arrangement, data storage device 210 can comprise two or more non-transitory computer-readable storage mediums. Each non-transitory computer-readable storage medium can comprise volatile and/or non-volatile storage components, such as optical, magnetic, organic or other memory or disc storage, which can be integrated in whole or in part with a processor, such as processor 204.

Data storage device 210 can store a variety of data. As shown in FIG. 2, data storage device 210 can store repair orders (RO) 214, baseline data 216, vehicle service request (VSR) data 218, computer-readable program instructions (CRPI) 220, vehicle leverage data 222, parts leverage data 224, baseline triggers 226, and baseline deviation thresholds 228.

RO 214 can comprise computer-readable RO. The computer-readable RO can be arranged as a structured query language (SQL) file, an extensible markup language (XML) file, or some other type of computer-readable file or data structure. The RO within RO 214 can be received from RO manual entry device 202, from network interface 208 by way of network 104, or from another device.

Figure 4:
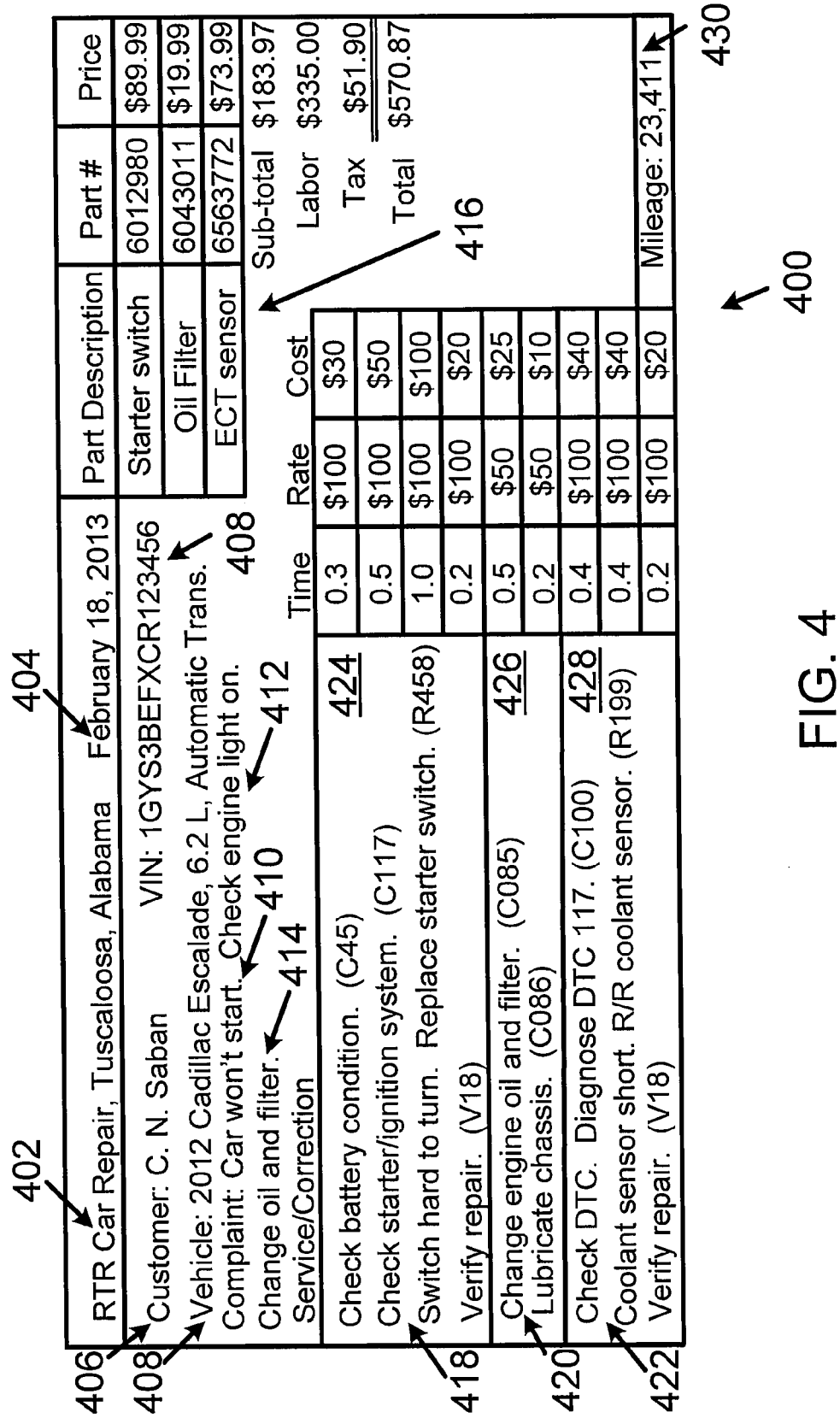
FIG. 4 shows an example repair order.

FIG. 4 shows an example RO 400. RO 400 can be generated by repair shop equipment, such as any of the RSE shown in FIG. 1. If generated by RSE 108, 110, or 112, RO 400 can comprise a computer-readable RO transmitted over network 104.

RO 400 includes a service provider identifier 402, a date of service identifier 404, a customer indicator 406 that indicates a customer seeking service of a given vehicle, vehicle information 408 that indicates the given vehicle, vehicle service requests (VSR) 410, 412, and 414 indicating the complaint(s) or service(s) requested by the customer, parts information 416 indicating parts obtained for servicing the given vehicle, service procedure information 418, 420, and 422 carried out on the given vehicle, and vehicle mileage data 430.

Service provider identifier 402 can include information that indicates a name and geographic location of the service provider. Vehicle information 408 can include a vehicle identification number (VIN) associated with the given vehicle and a description of the given vehicle. Service procedure information 418, 420, and 422 can include information within distinct sections 424, 426, and 428, respectively, of RO 400. The service procedure information within any one distinct section 424, 426, and 428 can be unrelated to the service procedure information with any other distinct section. Alternatively, two or more distinct sections including service procedure information can pertain to related service operations performed on the given vehicle.

Some RO stored within RO 214 can be arranged in a configuration that differs from RO 400. Nevertheless, the RO arranged in another configuration typically includes at least one of the types of information described above as being a part of RO 400.

The RO stored within RO 214 can comprise searchable text or symbols (e.g., text, symbols, or text and symbols). As an example, a symbol on an RO can comprise an empty check box or a checkbox and a checkmark inside the checkbox.

RO 400 includes labor operation codes (LOC). The labor operation codes can conform to those defined by a vehicle manufacturer, a service provider that generates an RO, a service information provider, such as Mitchell Repair Information, LLC, Poway, Calif., or some other entity. For simplicity of FIG. 4, the labor operation codes are shown within parenthesis, such as (C45) and (C117). Each LOC can refer to a particular operation performed to the given vehicle. Processor 204, executing CRPI 220, can use a LOC to determine what type of operation was performed to the given vehicle. Using the LOC in that manner is helpful if other information regarding that operation is incomplete or described using non-standard phrases or terms. Processor 204 can also use LOC to determine context for a service line of the RO.

Multiple portions of text on an RO can be grouped as phrases. When comparing contents of an RO to various terms, such as mapping terms, standard terms, or context terms, words within a given proximity to one or more other words can be grouped as a phrase to be compared to the mapping, standard, or context terms. The given proximity can be within X words, where X equals 1, 2, 3, 4, 5, or some other number of words. As an example, service procedure information 418 states "Check starter/ignition system." The words "Check" and "ignition system" are within 3 words of one another. In accordance with an embodiment in which the given proximity is greater than 1 word, the words "Check" and "ignition system" can be grouped as the phrase "Check ignition system" for comparison to mapping, standard, context terms, or labor operation codes.

The mapping, standard, context terms, or labor operation codes can be a part of a taxonomy database stored within data storage device 210 or other computer-readable data storage. The taxonomy database can include data that identifies words or phrases that are associated with one another. The association can be based on the words or phrases having a common meaning. The words or phrases identified as being associated with one another can be referred to a "taxonomy database group" or, more simply, a "taxonomy group."

The taxonomy database can include one or more taxonomy groups, and each taxonomy group can include one or more words or phrases. As an example, the taxonomy database can include data that identifies the following phrases as a taxonomy group: (i) stalls when cold, (i) engine quits when temperature is low, (iii) engine dies in the morning, (iv) dies in the morning, (v) dies in the AM, and (vi) engine stalls on cold mornings. Each taxonomy group can be associated with a standard term, which could be a first word or first phrase added to the taxonomy group. Alternatively, a word or phrase subsequently added to the taxonomy group can be the standard term for the taxonomy group. The words or phrases other than the standard term can be mapping terms. The words or phrases within each taxonomy group can be obtained from an RO. An administrator may approve adding or modifying any taxonomy group.

Returning to FIG. 2, CRPI 220 can comprise any of a variety of program instructions executable by processor 204 to carry out functions described herein or performable by ROS 200. CRPI 220 can comprise program instructions that are executable to parse data from the repair order of RO 214 and to identify the VSR, vehicle identification, and parts usage information from each RO so as to produce one or more VSR records from the repair orders within RO 214. Each VSR record can be associated with one or more labor operation codes.

VSR data 218 can comprise computer-readable data that indicate vehicle service requests within a repair order of RO 214. Each VSR within VSR data 218 can include data regarding the VSR. The data regarding the VSR could comprise any data on located on an RO. The data regarding the VSR could comprise a reference to other data stored in data storage device 210, such as a vehicle leverage data identifier associated with a vehicle identified on the RO or a parts leverage data identifier associated with a part identified on the RO.

As an example, a VSR within VSR data 218 can comprise (i) text regarding a symptom the vehicle is exhibiting, such as the text of VSR 412 (i.e., "Check engine light on"), (ii) the date of service identifier 404, (iii) an LOC, (iv) text regarding a diagnosis or repair of the symptom, such as some or all of the text within section 428 of RO 400, (v) a vehicle leverage data identifier, such as VLD-1 shown in table 1 below, (vi) a common vehicle part identifier, such as PLD-1 shown in table 2 below, and (vii) vehicle mileage data 430.

Vehicle leverage data 222 can comprise computer-readable data that identifies different vehicle models built on a common vehicle platform. Vehicles built on a common vehicle platform can have many similarities including the use of common parts or part numbers. Vehicles built on a common platform can experience similar vehicle symptoms that arise for similar reasons, such as failure of a part common to vehicles built on the common vehicle platform. Processor 204 can execute CRPI 220 to refer to vehicle leverage data 222 to identify VSR data within VSR data 218 for each defined vehicle type. Table 1 shows an example of data that can be stored as vehicle leverage data 222.

TABLE 1

| Vehicle Leverage Data Identifier (VLD ID) | Vehicle Models | Model Year(s) | Exceptions |
|---|---|---|---|
| VLD-1 | Cadillac Escalade, Chevrolet Tahoe, Chevrolet Suburban, GMC Yukon | 2011-2013 | GMC Yukon uses hi-capacity radiator |
| VLD-2 | Chevrolet Lumina APV, Pontiac Trans Sport, Oldsmobile Silhouette | 1990-1996 | N.A. |
| VLD-3 | Buick Regal, Oldsmobile Intrigue | 1998-2002 | N.A. |
| VLD-4 | Ford Expedition, Lincoln Navigator | 2008-2014 | Lincoln Navigator uses aluminum cylinder heads |

Processor 204 could use the exception data within vehicle leverage data to exclude certain vehicle models from a group of vehicles built on a common platform for some or all vehicle service requests (VSRs). For the exception data in Table 1, since the GMC Yukon uses a different radiator than the Cadillac Escalade, the Chevrolet Tahoe, and the Chevrolet Suburban, VSRs pertaining to a radiator for a GMC Yukon may not be grouped with VSRs pertaining to a radiator on Cadillac Escalades, Chevrolet Tahoes, and Chevrolet Suburbans.

Parts leverage data 224 can comprise data that identifies different vehicle models that use a common part produced by a part(s) manufacturer. For purposes of this description, a common part is a part that can be used in either of two or more vehicle models without altering the part or any of the two or more vehicles to use the common part. Various references to a common part, such as a part number or part name, used by any or all of the part(s) manufacturer and the manufacturer(s) of the different vehicle models can be used. Vehicle models using a common part can experience similar vehicle symptoms that arise for similar reasons, such as failure of the common part. Processor 204 can execute CRPI 220 to refer to parts leverage data (PLD) 224 to identify VSR within VSR data 218 for each defined vehicle type. Table 2 shows an example of data that can be stored as parts leverage data 224.

TABLE 2

| Common Vehicle Part Identifier | Common Vehicle Part | Vehicle Models | Model Year(s) | Part(s) manufacturer |
|---|---|---|---|---|
| PLD-1 | Coolant temperature sensor | Cadillac Escalade | 2012 | Delco Parts, Inc. |
| PLD-1 | Coolant temperature sensor | Chevrolet Tahoe | 2012 | Delco Parts, Inc. |
| PLD-1 | Coolant temperature sensor | Chevrolet Suburban | 2012 | Delco Parts, Inc. |
| PLD-2 | Fuel injector(s) | Honda Accord | 2013 | ACME, Inc. |
| PLD-2 | Fuel injector(s) | Honda Civic | 2013 | ACME, Inc. |

Baseline triggers 226 comprise data indicating trigger points for establishing a baseline within baseline data 216. The data representing the trigger points can be called triggers. In one respect, some or all of the trigger(s) within baseline triggers 226 can be based on time. For example, time-based triggers can include triggers of 7 days, 30 days, 180 days, 365 days, or some other number of days. Those and other time-based triggers can be represented using other units of time, such as hours, minutes, second, etcetera.

Processor 204 can execute CRPI 220 to track an amount of time for comparison to a trigger. Processor 204 can start tracking the amount of time in response to detecting any of a variety of events. As an example, the event that causes tracking an amount of time can include receiving an RO with a new VSR or producing a new type of VSR record within VSR data 218. A time associated with the event that causes tracking the amount of time can be stored as part of a VSR record.

Processor 204 can execute CRPI 220 to determine that a baseline trigger has been reached. For example, 168 hours (i.e., the number of hours in 7 days) after a new type of VSR record is produced for or within VSR data 218, processor 204 can determine that the 7-day baseline trigger has been reached for the new type of VSR record and responsively generate a 7-day VSR baseline based on VSR data 218 and the new type of VSR record. As another example, 552 hours (i.e., the number of hours in 23 days) after the 7-day baseline trigger is reached, processor 204 can determine that the 30-day baseline trigger has been reached for the new type of VSR record and responsively generate a 30-day VSR baseline based on VSR data 218 and the new type of VSR record.

In another respect, some or all of the trigger(s) within baseline triggers 226 can be based on a number of vehicles serviced or a number of repair orders within RO 214. As an example, the number of vehicles serviced and the number of RO can be 1,000 or some other number(s). A trigger based on the number of vehicles or RO could be limited to vehicles or RO associated with common vehicle identification. In that way, instead of the trigger being for every 1,000 vehicles serviced, where the vehicles can be any make or model, the trigger can be for 1,000 vehicles having a common vehicle identification being serviced. A count of vehicles or RO can begin when ROS 200 detects a first vehicle having the common vehicle identification being serviced or an RO for that first vehicle being serviced.

Processor 204 can execute CRPI 220 to track a number of vehicles or RO for comparison to a trigger. Processor 204 can start tracking the number of vehicles or RO in response to detecting any of a variety of events. As an example, the event that causes tracking number of vehicles or RO can include receiving an RO with a new VSR or producing a new VSR record within VSR data 218. A counter for tracking the number of vehicles or RO can be stored as part of a VSR record.

Processor 204 can execute CRPI 220 to determine that a baseline trigger based on a number of serviced vehicles or RO has been reached. For example, after each 1,000 VSR records for vehicles having a common identification or RO pertaining to the vehicles having the common identification are produced, processor 204 can determine that a 1,000 vehicles serviced or 1,000 RO baseline trigger has been reached for the new VSR record and responsively generate a 1,000 vehicle or RO VSR baseline based on VSR data 218 and the new VSR record.

Processor 204 can execute CRPI 220 to determine that words or phrases within service procedure information, such as service procedure information 418, 420, or 422, are within one or more taxonomy groups of the taxonomy database, and to associate (for example, relate) that service procedure information with the one or more taxonomy groups. The service procedure information associated with any given taxonomy group can be part of the new VSR record or additional VSR data to be added to a VSR record to modify the VSR record.

Baseline deviation thresholds 228 can comprise computer-readable data that identifies one or more thresholds for processor 204 determining a deviation within modified VSR data within VSR data 218 with respect to a VSR data baseline within baseline data 216. As an example, a baseline deviation threshold can comprise or represent a number, such as twenty-five [25]. The number can represent a percentage, such as 25%, or a decimal, such as 0.25.

Processor 204 can execute CRPI 220 to determine if the modified VSR data exceeds VSR data used to determine the VSR data baseline by at least the percentage represented by the baseline deviation threshold. If the baseline deviation threshold is exceeded, processor 204 detects the first deviation, otherwise, processor 204 can determine that a deviation in the modified VSR data does not exist with respect the VSR data used to determine the VSR data baseline.

Additionally or alternatively, processor 204 can execute CRPI 220 to determine if the VSR data used to determine the VSR data baseline exceeds the modified VSR data by at least the percentage represented by the baseline deviation threshold. If the baseline deviation threshold is exceeded in this arrangement, processor 204 detects the first deviation, otherwise, processor 204 can determine that a deviation in the modified VSR data does not exist with respect the VSR data used to determine the VSR data baseline.

Baseline data 216 can comprise computer-readable data stored as one or more VSR baselines. Processor 204 can execute CRPI 220 to determine one or more VSR baselines stored in baseline data 216. One or more of the VSR baselines stored within baseline data 216 can comprise a VSR baseline entered by user interface 206 or received by network interface 208.

Figure 6:
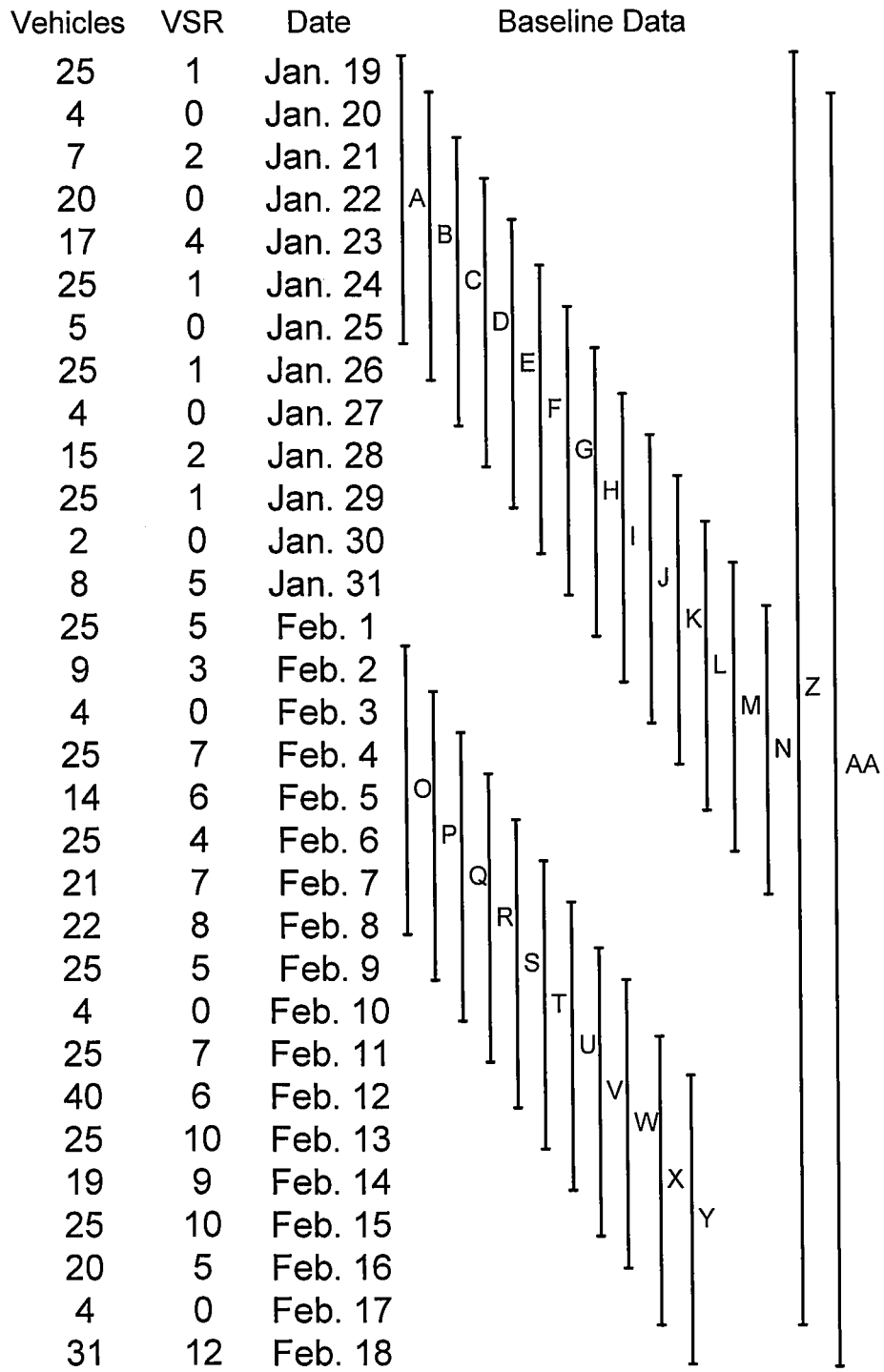
FIG. 6 is a diagram showing data pertaining to VSR baselines that can be stored within or as baseline data in a data storage device.

FIG. 6 is a diagram 600 showing data pertaining to VSR baselines that can be stored within or as baseline data 216. The lines labeled as A through Z and AA represents various VSR baselines. For purposes of this description, those lines will hereinafter be referred to as VSR baselines A through Z and AA, respectively. VSR baselines A through Y are 7-day VSR baselines. VSR baselines Z and AA are 30-day VSR baselines. The calendar dates shown on FIG. 6 can be for the calendar year 2013.

The VSR baselines A through Z and AA can be for an example vehicle type, such as the vehicle type identified on RO 400: Model Year (2012), Make (Cadillac), Model (Escalade). The example vehicle type is not limited to a single model year, make, or model. In accordance with vehicle leverage data 222, the example vehicle type for VSR baselines A through Z and AA can include 2011-2013 Cadillac Escalades, 2011-2013 Chevrolet Tahoes, 2011-2013 Chevrolet Suburbans, and 2011-2013 GMC Yukons. By referring to VSR pertaining to the vehicles in addition to the model year 2012 Cadillac Escalade, processor 204 may find a larger sample of VSR requests than if only the VSR for the model year 2012 Cadillac Escalade are referenced.

In addition to the example vehicle type, each VSR represented in FIG. 6 can pertain to a common request for vehicle service (i.e., a VSR) and a common resolution or action taken in response to the common VSR. As an example, the common VSR for FIG. 6 can also be with respect to VSR 412 and service procedure information 422. The number of VSR shown on FIG. 6 can represent, for each date shown on FIG. 6, a number of VSR for diagnosing a complaint of a check engine light being on within a vehicle represented by the VLD-1 identifier shown in Table 1, a diagnostic trouble code (DTC) 117 being set within the vehicle represented by the VLD-1 identifier shown in Table 1, and an engine coolant temperature (ECT) sensor being replaced within the vehicle represented by the VLD-1 identifier shown in Table 1.

The number of vehicles listed by each date can refer to the number of vehicles of the example vehicle type serviced on that date or the number of RO within RO 214 for the example vehicle type on the service date. Based on the foregoing description and FIG. 6, RO 214 can include 25 RO for the example vehicle type and 1 of the 25 RO can include the common VSR relating to VSR 412 and service procedure information 422.

The VSR baselines within baseline data 416 can comprise or be represented by a ratio. For example, VSR baseline A can be a ratio of the VSR quantity occurring on dates January 19 through January 25, inclusive (i.e., 8 VSR) divided by the number of vehicles of the example vehicle type serviced on those same dates (i.e., 103 vehicles). According to that example, VSR baseline A is 0.08 (i.e., 8 divided by 103). Table 3 shows VSR baseline values based on FIG. 6.

TABLE 3

| VSR Baseline ID | VSR Baseline Type | VSR Quantity | No. of Vehicles | VSR Baseline Value: VSR Quantity/No. of Vehicles |
|---|---|---|---|---|
| A | 7-Day | 8 | 103 | 0.08 |
| B | 7-Day | 8 | 103 | 0.08 |
| C | 7-Day | 8 | 103 | 0.08 |
| D | 7-Day | 8 | 111 | 0.07 |
| E | 7-Day | 9 | 116 | 0.08 |
| F | 7-Day | 5 | 101 | 0.05 |
| G | 7-Day | 9 | 104 | 0.09 |
| H | 7-Day | 14 | 88 | 0.16 |
| I | 7-Day | 16 | 88 | 0.18 |
| J | 7-Day | 16 | 98 | 0.16 |
| K | 7-Day | 21 | 87 | 0.24 |
| L | 7-Day | 26 | 110 | 0.24 |
| M | 7-Day | 30 | 123 | 0.24 |
| N | 7-Day | 32 | 120 | 0.27 |
| O | 7-Day | 35 | 136 | 0.26 |
| P | 7-Day | 37 | 136 | 0.27 |
| Q | 7-Day | 37 | 136 | 0.27 |
| R | 7-Day | 37 | 162 | 0.23 |
| S | 7-Day | 37 | 162 | 0.23 |
| T | 7-Day | 43 | 160 | 0.27 |
| U | 7-Day | 45 | 163 | 0.28 |
| V | 7-Day | 47 | 158 | 0.29 |
| W | 7-Day | 47 | 158 | 0.29 |
| X | 7-Day | 47 | 158 | 0.29 |
| Y | 7-Day | 52 | 164 | 0.31 |

TABLE 3-continued

| VSR Baseline ID | VSR Baseline Type | VSR Quantity | No. of Vehicles | VSR Baseline Value: VSR Quantity/No. of Vehicles |
|---|---|---|---|---|
| Z | 30-Day | 109 | 514 | 0.21 |
| AA | 30-Day | 120 | 520 | 0.23 |

FIG. 6 and Table 3 show that each 7-day VSR baseline is limited to a single 7 day period. In accordance with one or more example embodiments, a 7-day VSR baseline can be an aggregate of multiple 7-day periods, such as the multiple 7-day periods starting January 19 through January 25, inclusive, (i.e., the 7-day periods for VSR baselines A through F, inclusive). An average VSR quantity for those 6 days is 7.7 VSR/day (i.e., 46 VSR divided by 6 days). An average number of vehicles for those 6 days is 106.1 vehicles/day (i.e., 637 vehicles divided by 6 days). Those two averages provide for an aggregate VSR baseline value of 0.07 (i.e., 7.7 VSR/day divided by 106.1 vehicles/day).

The VSR data collected from RO of January 19 through January 25, inclusive, for VSR baseline A can be the initial or first VSR data for a 7-day baseline. The VSR data collected from RO of January 19 through February 17, inclusive, for VSR baseline Z can be the initial or first VSR data for a 30-day baseline. VSR data added to VSR data 218 for RO dated on or after Jan. 26, 2013 can comprise data that modifies the initial or first VSR data for the 7-day baseline VSR baseline A. Similarly, VSR data added to VSR data 218 for RO dated on or after Feb. 18, 2013 can comprise data that modifies the initial or first VSR data for the 7-day baseline referred to as VSR baseline A.

Figure 3:
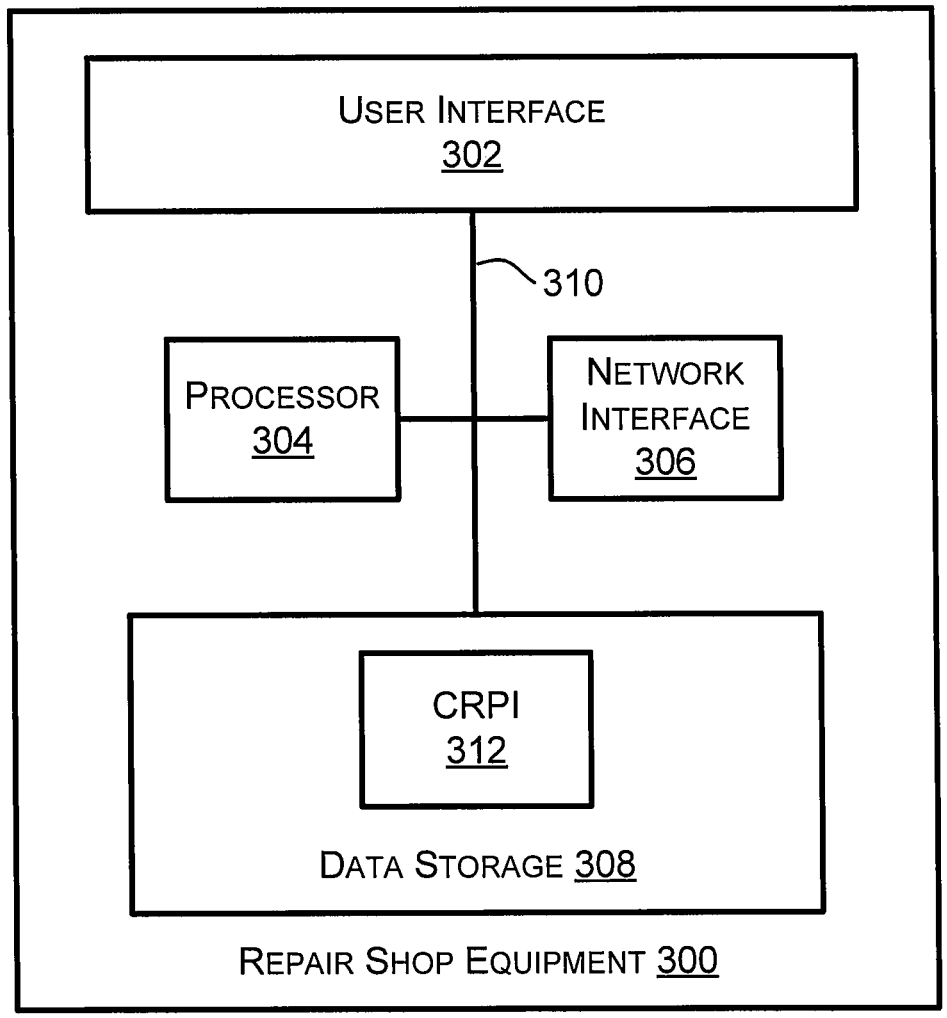
FIG. 3 is a block diagram showing details of example repair shop equipment (RSE)

Next, FIG. 3 is a block diagram showing details of example repair shop equipment (RSE) 300. RSE 300 includes a user interface 302, a processor 304, a network interface 306, and a data storage device 308, all of which can be linked together via a system bus, network, or other connection mechanism 310. One or more of the RSE shown in FIG. 1 can be arranged like RSE 300. RSE 300 can be arranged like one or more of RSE shown in FIG. 1.

Processor 304 can be configured to execute computer-readable program instructions, such as computer-readable program instructions (CRPI) 312 stored within data storage device 308. For purposes of this description, processor 304 executing CRPI 312 to perform some function described herein can comprise executing a portion of CRPI 312 or the entirety of CRPI 312. Executing a portion or the entirety of CRPI 312 can include executing some of the computer-readable program instructions multiple times.

Data storage device 308 can comprise a non-transitory computer-readable storage medium readable by processor 304. In an alternative arrangement, data storage device 308 can comprise two or more non-transitory computer-readable storage mediums. Each non-transitory computer-readable storage medium can comprise volatile and/or non-volatile storage components, such as optical, magnetic, organic or other memory or disc storage, which can be integrated in whole or in part with a processor, such as processor 304.

User interface 302 can comprise an interface to components operable to enter data or information into RSE 300 or to components that can present data or information output by RSE 300. Those components can be referred to as RSE user interface components. User interface 302 can include one or more audio/visual ports or communication ports that connect to an RSE user interface component by a wired or wireless user interface communication link. Data or information entered into RSE 300 by user interface 302 can include data or information for preparing an RO, such as RO 400.

User interface 302 can include one or more of the RSE user interface components. As an example, the RSE user interface components can include an infrared remote control device, a display device, a loud speaker configured to convert electrical signals to audible sounds, a keyboard, a touch screen, a pointing device, such as a computer mouse, or some other component for generating signals to enter data or information into RSE 300 or to present data or information output by user interface 302. User interface 302 can include a transmitter or transceiver to provide the data or information to another RSE user interface component. The data or information output by RSE 300 can comprise data for displaying a service bulletin generated in response to ROS 200 providing a notification identifying a deviation in VSR data detected by processor 204.

Network interface 306 can comprise an interface to one or more communication networks, such as network 104. For use with wireless communication networks, network interface 306 can comprise one or more antennas for transmitting or receiving wireless communications. Network interface 306 can include one or more communication ports configured to connect to a wired communication link of a network. Examples of the wired communication link are listed elsewhere herein. Network interface 306 can include a network controller including a transmitter, a receiver, or a transceiver. The transmitter or transceiver can provide data or information to a communication port for transmission as network communications over the connected network. The receiver or transceiver can receive data or information received at a communication from the connected network. The data or information received by network interface 306 can include a notification identifying a deviation in VSR data detected by processor 204. The data or information provided by network interface 306 to the network can include an RO.

CRPI 312 can comprise program instructions for generating an RO, such as RO 400, based on data input by user interface 302. CRPI 312 can comprise program instructions for performing diagnostic functions for diagnosing a vehicle identified on an RO. As an example, performing the diagnostic functions can include checking a diagnostic trouble code (DTC), such as a DTC 117, as identified in section 428 of RO 400.

III. Example Operation

Figure 5:
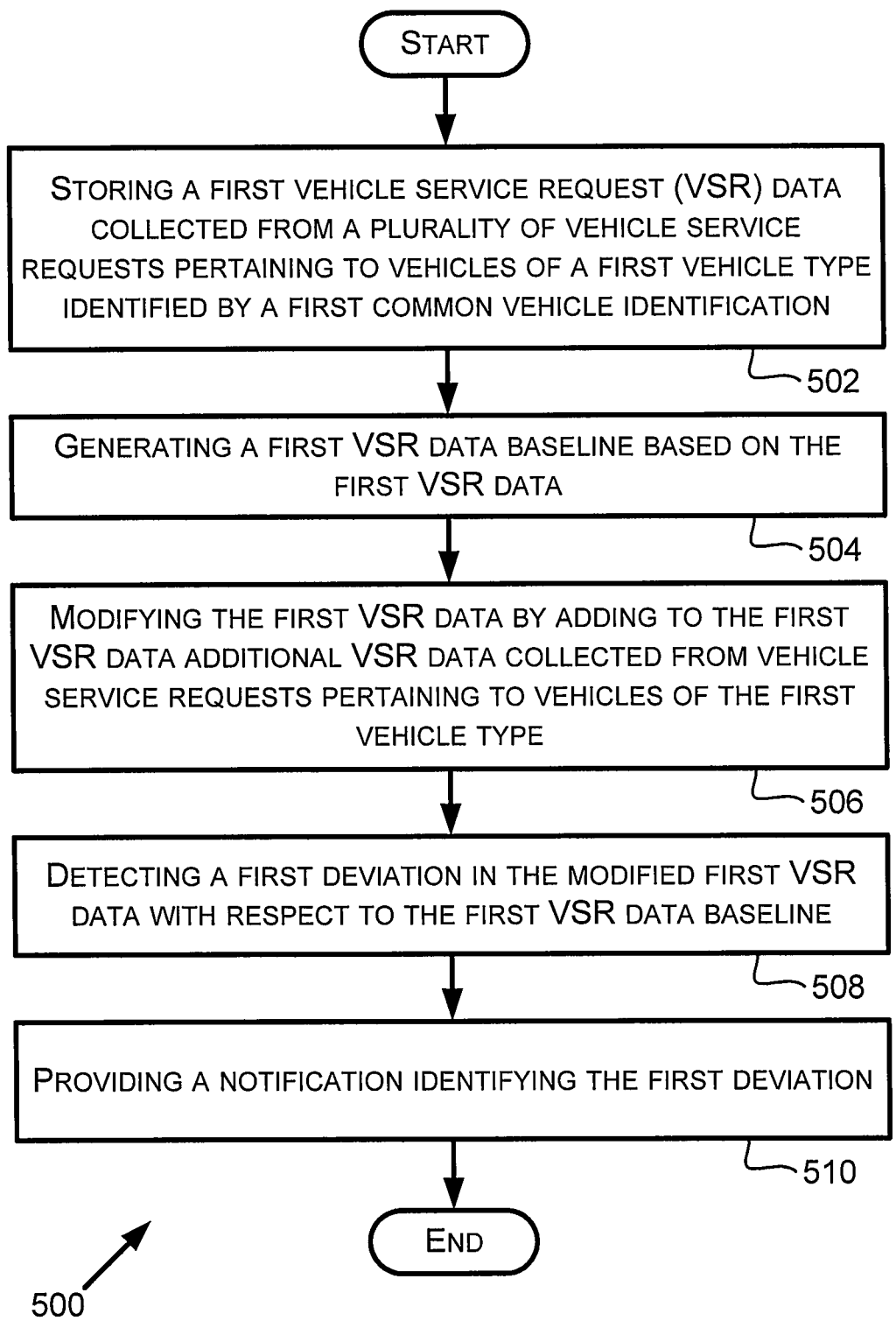
FIG. 5 is a flowchart depicting a set of functions that can be carried out in accordance with one or more example embodiments.

FIG. 5 is a flowchart depicting a set of functions 500 (or more simply "the set 500") that can be carried out in accordance with one or more example embodiments described herein. The set 500 includes the functions shown in blocks labeled with even numbers 502 through 510, inclusive. A variety of methods can be performed using one or more of the functions shown in set 500 and one or more other functions described herein.

Block 502 includes storing a first vehicle service request (VSR) data collected from a plurality of vehicle service requests pertaining to vehicles of a first vehicle type identified by a first common vehicle identification. The first vehicle type can be associated with the first common vehicle identification. Storing the first VSR data can comprise storing the first VSR data within data storage device 210, and in particular, within VSR data 218.

A common vehicle identification, such as the first common vehicle identification, can comprise various information. For example, a common vehicle identification can include data identifying a common vehicle make, a common vehicle model, and at least one vehicle year. As another example, a common vehicle identification can include data identifying a common vehicle make, at least two different vehicle models, and at least one vehicle year. As yet another example, a common vehicle identification can include data identifying vehicles on which a common vehicle part is installed. As still yet another example, any common vehicle identification can include descriptors of any components on or within a vehicle, such as descriptors of an engine displacement size or a powertrain.

Each vehicle type of one or more other vehicle types can be identified by, and associated with, a different common vehicle identification. VSR data collected from vehicle service requests on RO associated with vehicles of the other vehicle type(s) can be stored within VSR data 218.

Block 504 includes generating a first VSR data baseline based on the first VSR data. Processor 204 can execute CRPI 220 to generate the first VSR data baseline, such as VSR baseline A. The first VSR data baseline can include a first ratio of a first number of repairs to fix a common symptom of the vehicles of the first type and a first number of vehicles of the first vehicle type serviced. For instance, if the first number of repairs equals seven [7] and the first number of vehicles equals one thousand [1000], the first ratio can equal 7 divided by 1000 (i.e., 0.007) or 1000 divided by 7 (i.e., 142.8). The first number of repairs to fix the common symptom can include data indicating that each repair to fix the common symptom included replacement of a common part on a respective vehicle of the first vehicle type.

Block 506 includes modifying the first VSR data by adding to the first VSR data additional VSR data collected from vehicle service requests pertaining to vehicles of the first vehicle type. Processor 204 can execute CRPI 220 to modify the first VSR data. As an example, modifying the first VSR data can be performed within data storage device 210 or within processor 204.

Block 508 includes detecting a first deviation in the modified first VSR data with respect to the first VSR data baseline. Processor 204 can execute CRPI 220 to detect the first deviation. In one respect, processor 204 can detect the deviation by comparing the VSR baseline value for VSR baseline A to the VSR baseline value for any other 7-day VSR baseline. Comparing VSR baseline A with any of VSR baselines B, C or E would result in processor 204 detecting no deviation. Comparing VSR baseline A with any of VSR baseline D or F would result in processor 204 detecting a downward deviation. Comparing VSR baseline A with any of VSR baselines G though Y, inclusive, would result in processor 204 detecting an upward deviation.

Detecting the first deviation or any other deviation within the VSR data 218 can include determining that the first or other deviation exceeds a baseline deviation threshold. For example, if the baseline deviation threshold is 25% and the VSR baseline is 0.08, then any VSR baseline determined to exceed 0.1 (i.e., 0.08×1.25) can be considered the first or other deviation. As another example, if the baseline deviation threshold is 350% and the VSR baseline is 0.08, then any VSR baseline determined to exceed 0.28 (i.e., 0.08×3.5) can be considered the first or other deviation.

Block 510 includes providing a notification identifying the first deviation. Processor 204 can execute CRPI 220 to format the notification in response to detecting the first deviation and to provide the notification to user interface 206 or network interface 208. User interface 206 can provide the notification to a user interface component. Network interface 208 can provide the notification to network 104 for transmission, in turn, to a user interface component. A user interface can display or otherwise present the notification.

Referring to the data in Table 3, an upward deviation in the VSR baseline value indicates an increase in the rate at which RO regarding the example vehicle type list the example vehicle service request. Such increase can also indicate vehicles of the example vehicle type are exhibiting symptoms related to the example vehicle service request. Analysis of the RO for example vehicle type can lead to identifying service tips, fix tips, or other suggestions that can be published by way of a service bulletin. Processor 204 can execute CRPI to generate the service bulletin and provide for distribution of the service bulletin.

Providing the notification can be contingent upon processor 204 detecting that the deviation is an upward deviation. If the ratios of the VSR baseline values in Table 3 are inverted, a downward increase in the VSR baseline values can indicate an increase in the rate at which RO regarding the example vehicle type list the example vehicle services request. In that case, providing the notification can be contingent upon processor 204 detecting that the deviation is a downward deviation.

Processor 204 could also provide notifications if processor 204 detects that the deviation indicates the rate at which RO regarding the example vehicle type list the example vehicle services request is decreasing. Such notification can indicate that a corrective action implemented by a vehicle manufacturer has reduced the occurrence rate at which the vehicles of the example vehicle type are exhibiting symptoms related to the example vehicle service request.

The notification provided at block 510 can comprise various data regarding the first deviation. Some or all of the various data can be included within a document attached to the notification. Additionally or alternatively, the notification can include an identifier that identifies a reference to a data storage location from which data regarding the first deviation can be accessed or retrieved. As an example, the identifier can be a uniform resource locator (URL) or hyperlink.

A variety of methods including one or more other functions was discussed above with respect to the set 500. The following discussion provides examples of the one or more other functions. Each of these examples is referred to as "another function related to the set 500," or "other functions related to the set 500."

Another function related to the set 500 can include presenting the notification. Presenting the notification can include visually presenting the notification by a display device or other user interface component.

Other functions related to the set 500 can include storing a first threshold for detecting the first deviation, and detecting a second ratio of a second number of repairs to fix the common symptom of the vehicles of the first vehicle type and a second number of the vehicles of the first vehicle type serviced. Data storage device 210 can store the first threshold within baseline deviation thresholds 228. Processor 204 can execute CRPI 220 to detect the second ratio based on the modified first VSR data. Processor 204 can detect the first deviation by detecting that the first ratio and the second ratio differ by at least the first threshold. For these other functions, the first ratio can include a ratio of a first number of repairs to fix a common symptom of the vehicles of the first vehicle type and a first number of the vehicles of the first vehicle type serviced.

Other functions related to the set 500 can include storing a second threshold for detecting the first deviation, and detecting a second ratio of a second number of repairs to fix the common symptom of the vehicles of the first vehicle type and a second time duration. Data storage device 210 can store the second threshold within baseline deviation thresholds 228. Processor 204 can execute CRPI 220 to detect the second ratio based on the modified first VSR data. Processor 204 can detect the first deviation by detecting that the first ratio and the second ratio differ by at least the second threshold. For these other functions, the first ratio can include a ratio of a first number of repairs to fix a common symptom of the vehicles of the first vehicle type and a first time duration. The first time duration and the second time duration can be equivalent time durations starting on different calendar dates of different times on a common calendar date.

Another function related to the set 500 can include adjusting a baseline deviation threshold based on one or more threshold adjustment factors. Processor 204 can execute CRPI 220 to adjust the baseline deviation threshold. The one or more threshold adjustment factors can be stored within data storage device 210.

Another function related to the set 500 can include filtering the first VSR data based on a mileage range to limit the vehicle service requests used to generate the first VSR data baseline to vehicle services requests pertaining to vehicles of the first vehicle type having a mileage within the mileage range. Processor 204 can execute CRPI 220 to filter the first VSR data. Generating the first VSR baseline data at block 504 can include or occur after filtering the first VSR data based on a mileage range.

IV. Conclusion

Example embodiments have been described above. Those skilled in the art will understand that changes and modifications can be made to the described embodiments without departing from the true scope and spirit of the present invention, which is defined by the claims.

I claim:

1. A method comprising:
   storing, by a non-transitory computer-readable data storage device, vehicle service request (VSR) data collected from a plurality of vehicle service requests pertaining to vehicles of a first vehicle type identified by a first common vehicle identification, wherein the plurality of vehicle service requests include date-of-service indicators for determining one or more time periods associated with each vehicle service request;
   generating, by a processor, a first VSR data baseline based on a first quantity of multiple vehicles of the first vehicle type that the VSR data indicates exhibited a common symptom and were fixed by a common repair during a first time period;
   generating, by the processor, a second VSR data baseline based on a second quantity of multiple vehicles of the first vehicle type that the VSR data indicates exhibited the common symptom and were fixed by the common repair during a second time period;
   detecting, by the processor, a first deviation in the second VSR data baseline with respect to the first VSR data baseline; and
   providing, by the processor, a notification identifying the first deviation.

2. The method of claim 1, wherein the first VSR data baseline includes a first ratio of the first quantity of multiple vehicles and a first number indicating how many vehicles of the first vehicle type were serviced during the first time period.

3. The method of claim 2, wherein the common repair includes replacement of a common part on a vehicle of the first vehicle type.

4. The method of claim 2, further comprising:
   storing, by the data storage device, a threshold for detecting the first deviation; and
   detecting, by the processor based on the VSR data, a second ratio of the second quantity of multiple vehicles and a second number indicating how many vehicles of the first vehicle type were serviced during the second time period,
   wherein detecting the first deviation comprises detecting, by the processor, that the first ratio and the second ratio differ by at least the threshold.

5. The method of claim 4, wherein the first number indicating how many vehicles of the first vehicle type were serviced during the first time period and the second number indicating how many vehicles of the first vehicle type were serviced during the second time period are equivalent numbers.

6. The method of claim 4, further comprising:
   adjusting, by the processor, the threshold based on one or more threshold adjustment factors.

7. The method of claim 1, wherein the first VSR data baseline includes a first ratio of the first quantity of multiple vehicles and the first time period.

8. The method of claim 7, wherein the common repair includes replacement of a common part on a vehicle of the first vehicle type.

9. The method of claim 7, further comprising:
   storing, by the data storage device, a threshold for detecting the first deviation; and
   detecting, by the processor based on the VSR data, a second ratio of the second quantity of multiple vehicles and the second time period,
   wherein detecting the first deviation comprises detecting, by the processor, that the first ratio and the second ratio differ by at least the threshold.

10. The method of claim 9, wherein the first time period and the second time period are equal in length but start on different calendar dates.

11. The method of claim 9, further comprising:
    adjusting, by the processor, the threshold based on one or more threshold adjustment factors.

12. The method of claim 1, wherein the first common vehicle identification comprises data identifying a common vehicle make, a common vehicle model, and at least one vehicle year.

13. The method of claim 1, wherein the first common vehicle identification comprises data identifying a common vehicle make, at least two different vehicle models, and at least one vehicle year.

14. The method of claim 1, wherein the first common vehicle identification comprises data identifying vehicles on which a common vehicle part is installed.

15. The method of claim 1, wherein generating the first VSR data baseline includes filtering the VSR data based on a mileage range to limit the vehicle service requests used to generate the first VSR data baseline to vehicle services requests pertaining to vehicles of the first vehicle type having a mileage within the mileage range.

16. The method of claim 1, wherein providing the notification identifying the first deviation is contingent upon detecting, by the processor, that the first deviation is an upward deviation that exceeds the first VSR data baseline by a threshold amount.

17. The method of claim 1, further comprising:
    storing, by the computer-readable data storage device, a taxonomy database including at least one taxonomy group having data that identifies words or phrases associated with one another as having a common meaning; and determining, by the processor, the VSR data includes words or phrases identified by a common taxonomy group within the taxonomy database.

18. The method of claim 17, further comprising:

modifying a first taxonomy group within the taxonomy database to include a word or phrase having a common meaning with other words or phrases within the first taxonomy group.

19. A non-transitory computer-readable medium storing:

vehicle service request (VSR) data collected from a plurality of vehicle service requests pertaining to vehicles of a first vehicle type identified by a first common vehicle identification, wherein the plurality of vehicle service requests include date-of-service indicators for determining one or more time periods associated with each vehicle service request; and program instructions executable by a processor to perform or cause performance of operations including:

generating a first VSR data baseline based on a first quantity of multiple vehicles of the first vehicle type that the VSR data indicates exhibited a common symptom and were fixed by a common repair during a first time period;

generating a second VSR data baseline based on a second quantity of multiple vehicles of the first vehicle type that the VSR data indicates exhibited the common symptom and were fixed by the common repair during a second time period;

detecting a first deviation in the second VSR data baseline with respect to the first VSR data baseline; and providing a notification identifying the first deviation.

20. A system comprising:

a processor; and a non-transitory computer-readable data storage device storing a vehicle service request (VSR) data collected from a plurality of vehicle service requests pertaining to vehicles of a first vehicle type identified by a first common vehicle identification, and storing computer-readable program instructions, wherein the plurality of vehicle service requests include date-of-service indicators for determining one or more time periods associated with each vehicle service request, wherein the computer-readable program instructions are executable by the processor to:

generate a first VSR data baseline based on a first quantity of multiple vehicles of the first vehicle type that the VSR data indicates exhibited a common symptom and were fixed by a common repair during a first time period;

generate a second VSR data baseline based on a second quantity of multiple vehicles of the first vehicle type that the VSR data indicates exhibited the common symptom and were fixed by the common repair during a second time period;

detect a first deviation in the second VSR data baseline with respect to the first VSR data baseline; and provide a notification identifying the first deviation.

21. The system of claim 20, further comprising:

a transceiver, wherein the transceiver is configured to transmit the notification.

22. The system of claim 20, wherein the transceiver is configured to receive the vehicle service data for subsequent storage within the data storage device.

* * * * *